US012786360B2

(12) United States Patent
Osachi et al.

(10) Patent No.: US 12,786,360 B2
(45) Date of Patent: Nov. 3, 2026

(54) PROJECTION SYSTEM

(71) Applicant: SEIKO EPSON CORPORATION, Tokyo (JP)

(72) Inventors: Yuki Osachi, Matsumoto (JP); Kazuhisa Mizusako, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 314 days.

(21) Appl. No.: 18/521,424

(22) Filed: Nov. 28, 2023

(65) Prior Publication Data

US 2024/0179277 A1 May 30, 2024

(30) Foreign Application Priority Data

Nov. 29, 2022 (JP) ................................ 2022-190189

(51) Int. Cl.
*H04N 9/31* (2006.01)
*G03B 21/14* (2006.01)

(52) U.S. Cl.
CPC ......... *H04N 9/3147* (2013.01); *H04N 9/3129* (2013.01)

(58) Field of Classification Search
CPC ..... G03B 21/14; H04N 9/3147; H04N 9/3188
See application file for complete search history.

(56) References Cited

U.S. PATENT DOCUMENTS

| | | | | |
|---|---|---|---|---|
| 2015/0123959 | A1* | 5/2015 | Yatabe ................. | G09G 3/3614 345/99 |
| 2016/0173838 | A1 | 6/2016 | Maeda | |
| 2018/0013995 | A1* | 1/2018 | Mizushiro ............ | H04N 9/3182 |
| 2020/0213567 | A1 | 7/2020 | Okada et al. | |
| 2020/0304762 | A1* | 9/2020 | Nakamura ........... | H04N 9/3161 |

FOREIGN PATENT DOCUMENTS

| | | |
|---|---|---|
| JP | 2016-116035 A | 6/2016 |
| JP | 2017-009930 A | 1/2017 |
| JP | 2020-107984 A | 7/2020 |

* cited by examiner

*Primary Examiner* — Ryan D Howard
(74) *Attorney, Agent, or Firm* — Oliff PLC

(57) ABSTRACT

A projection system 1 includes a projector 3_1 that updates an image Img_1 by vertical scanning of an internal liquid crystal panel and shifts a projection position of the image Img_1, and a projector 3_2 that updates an image Img_2 by vertical scanning of an internal liquid crystal panel and shifts a projection position of the image Img_2. When there is an overlapping region in which the image Img_1 projected by the projector 3_1 and the image Img_2 projected by the projector 3_2 overlap each other along a direction parallel to a direction of the vertical scanning direction, the vertical scanning direction of the liquid crystal panel of the projector 3_1 and the vertical scanning direction of the liquid crystal panel of the projector 3_2 are set to be opposite to each other.

4 Claims, 14 Drawing Sheets

PROJECTION SYSTEM

The present application is based on, and claims priority from JP Application Serial Number 2022-190189, filed Nov. 29, 2022, the disclosure of which is hereby incorporated by reference herein in its entirety.

BACKGROUND

1. Technical Field

The present disclosure relates to a projection system.

2. Related Art

For a projector that projects image light emitted from a liquid crystal panel or the like onto a screen or the like, a technology is known that artificially increases resolution using an optical path shifting element. More specifically, in the projector related to this technology, a projection position of the image light emitted from one panel pixel in the liquid crystal panel is shifted once every plurality of unit periods in one frame period to express a plurality of pixels in image data (see JP-A-2020-107984, for example).

Further, a projection system is also proposed in which the image light is projected from two or more projectors, and the projection image light is combined to form a single image. In particular, for combining two or more projectors whose resolution is artificially increased using an optical path shifting element, a technology is known that reduces a deviation amount of a shift amount (see JP-A-2016-116035, for example).

However, while modulation of the image light in a liquid crystal panel is performed line-sequentially, shifting of an emission optical path of the image light by the optical path shifting element is performed frame-sequentially. Therefore, for example, when the image light projected by one of the projectors and the image light projected by the other projector overlap each other in the vertical direction, there is a problem in that, in the overlapping region, the appearance of the image light whose emission optical path has been shifted is different between the one projector and the other projector, resulting in deterioration in perceived resolution.

In view of such circumstances, an advantage of one aspect of the present disclosure is to provide a technique for suppressing deterioration in perceived resolution in an overlapping region, when combining two or more projectors whose resolution is artificially increased using an optical path shifting element.

SUMMARY

In order to solve the above-described problem, a projection system according to an aspect of the present disclosure includes a first projector including a first electro-optical device configured to emit first image light representing a first screen updated by vertical scanning, a first optical path shifting element configured to shift an emission optical path of the first image light, and a first projection optical member configured to project the first image light having the emission optical path shifted, a second projector including a second electro-optical device configured to emit second image light representing a second screen updated by vertical scanning, a second optical path shifting element configured to shift an emission optical path of the second image light, and a second projection optical member configured to project the second image light having the emission optical path shifted, and a vertical scanning direction setting unit, wherein when there is a first overlapping region in which the first image light projected by the first projection optical member and the second image light projected by the second projection optical member overlap each other along a first direction parallel to a direction of the vertical scanning, the vertical scanning direction setting unit sets a direction of the vertical scanning in the first electro-optical device and a direction of the vertical scanning in the second electro-optical device to be an opposite to each other.

BRIEF DESCRIPTION OF THE DRAWINGS

FIG. 8 is a diagram illustrating a relationship between an array of original image pixels and an array of panel pixels, and the like.

DESCRIPTION OF EMBODIMENTS

A projection system according to an embodiment will be described below with reference to the drawings. Note that in each of the drawings, dimensions and scale of each part are made different from actual ones as appropriate. Further, embodiments described below are suitable specific examples, and various technically preferable limitations are applied, but the scope of the disclosure is not limited to these embodiments unless they are specifically described in the following description as limiting the disclosure.

Figure 1:
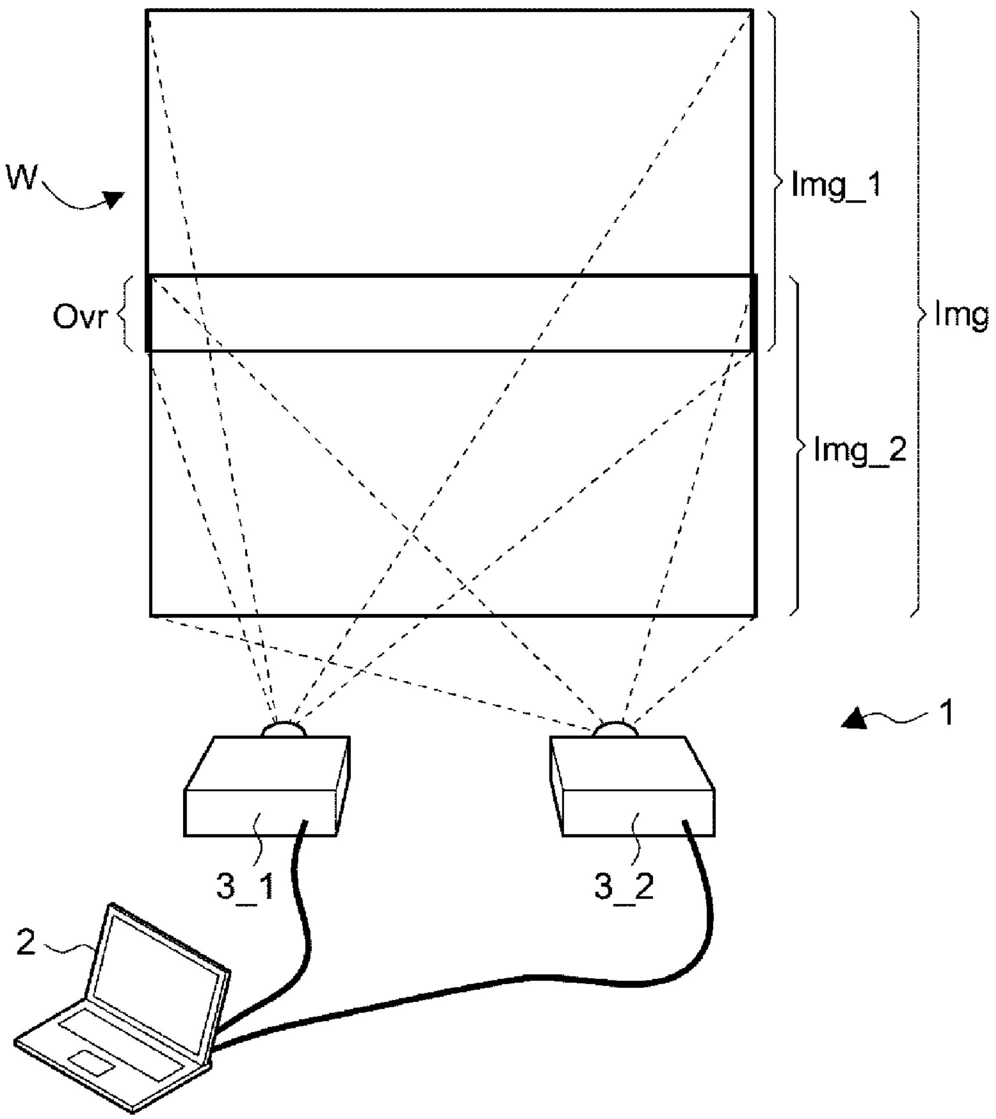
FIG. 1 is a diagram illustrating a configuration of a projection system according to an embodiment.

FIG. 1 is a diagram illustrating a configuration of a projection system 1 according to the embodiment. The projection system 1 according to the description is a so-called multi-projection system that projects image light onto a projection surface, such as a single screen, using a plurality of projectors.

As illustrated in FIG. 1, the projection system 1 according to the embodiment includes two projectors 3_1 and 3_2.

A host 2 supplies image data representing a projection image Img_1 to the projector 3_1, and supplies image data representing a projection image Img_2 to the projector 3_2.

Further, the host 2 commonly supplies a control signal to the projectors 3_1 and 3_2, for synchronizing the control of the projectors 3_1 and 3_2.

The projection image Img_1 and the projection Img_2 constitute a single projection image Img, as illustrated in FIG. 1. In other words, the projection image Img is expressed by combining the upper projection image Img_1 and the lower projection image Img_2.

Note that an overlapping region between the projection image Img_1 and the projection image Img_2 is denoted by Ovr. Further, when the projectors 3_1 and 3_2 are generally described without being specifically identified, the "-" (hyphen) and subsequent numeral used for identification are omitted and simply "3" is used.

Figure 2:
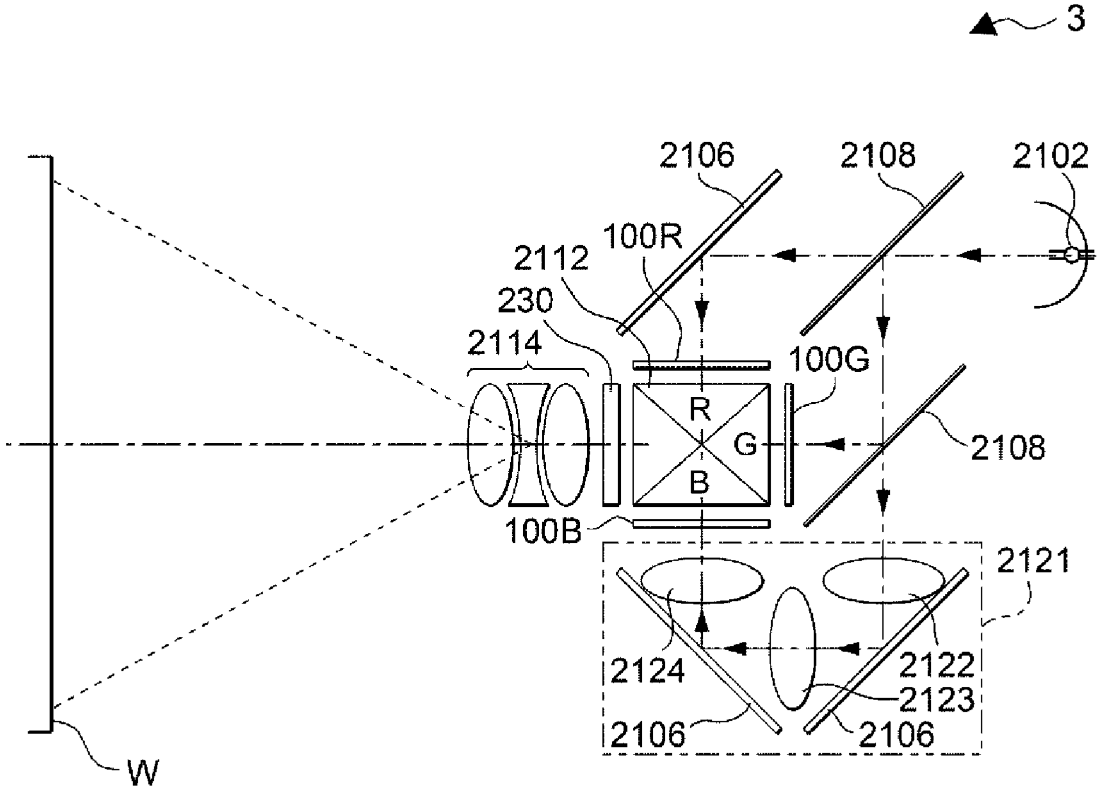
FIG. 2 is a diagram illustrating an optical configuration of a projector.

FIG. 2 is a block diagram illustrating an optical configuration of the projector 3. As illustrated in FIG. 2, the projector 3 includes liquid crystal panels 100R, 100G, and 100B. Further, a lamp unit 2102 formed by a white light source such as a halogen lamp is provided inside the projector 3. Light emitted from the lamp unit 2102 is split into three primary colors of red (R), green (G), and blue (B) by three mirrors 2106 and two dichroic mirrors 2108 disposed inside the projector 3. Of the light of the primary colors, light of R, light of G, and light of B are incident on the liquid crystal panel 100R, the liquid crystal panel 100G, and the liquid crystal panel 100B, respectively.

Note that since an optical path of B is longer than each of optical paths of R and G, it is necessary to prevent a loss in the B optical path. Thus, a relay lens system 2121 including an incidence lens 2122, a relay lens 2123, and an emission lens 2124 is provided at the B optical path.

The liquid crystal panel 100R includes a plurality of pixel circuits. Each of the plurality of pixel circuits includes a liquid crystal element. As described below, by the liquid crystal element of the liquid crystal panel 100R being driven based on a data signal corresponding to R, the liquid crystal panel 100R comes to have a transmittance corresponding to the data signal. Thus, in the liquid crystal panel 100R, image light representing a transmission image of R is generated by individually controlling the transmittance of the liquid crystal element. Similarly, in the liquid crystal panel 100G, image light representing a transmission image of G is generated based on a data signal corresponding to G, and in the liquid crystal panel 100B, image light representing a transmission image of B is generated based on a data signal corresponding to B.

The image light representing the transmission images of each of the colors generated by the liquid crystal panels 100R, 100G, and 100B, respectively, are incident on a dichroic prism 2112 from three directions. At the dichroic prism 2112, the light of R and the light of B are refracted at 90 degrees, whereas the light of G travels in a straight line. Thus, the dichroic prism 2112 combines the image light of the respective colors. The image light combined by the dichroic prism 2112 is incident on a projection lens 2114 via an optical path shifting element 230.

The projection lens 2114 enlarges and projects the combined image light incident through the optical path shifting element 230, onto a projection surface W.

The optical path shifting element 230 shifts the optical path of the combined image light emitted from the dichroic prism 2112. More specifically, the optical path shifting element 230 shifts an emission optical path of the image light projected onto the projection surface W, in the left-right direction or in the up-down direction with respect to the projection surface.

Note that, while the image light representing the transmission images by the liquid crystal panels 100R and 100B are projected after being reflected by the dichroic prism 2112, the image light representing the transmission image by the liquid crystal panel 100G travels in the straight line and is projected. Thus, the transmission images represented by each of the image light emitted from the liquid crystal panels 100R and 100B are inverted in the left-right direction with respect to the transmission image represented by the image light emitted from the liquid crystal panel 100G.

For convenience of description, when the projection surface W is viewed from the projector 3, the leftward direction is defined as an X direction, and the downward direction is defined as a Y direction.

When the projectors 3 are considered not generally but individually, the projector 3_1 is an example of a first projector. The projection image Img_1 is a composite image represented by composite light obtained by combining the image light emitted from the liquid crystal panels 100R, 100G, and 100B of the projector 3_1. Thus, the image light representing the projection image Img_1 is an example of first image light, and the liquid crystal panels 100R, 100G, and 100B of the projector 3_1 are examples of a first electro-optical device. The projection lens 2114 of the projector 3_1 is an example of a first projection optical member, and the optical path shifting element 230 of the projector 3_1 is an example of a first optical path shifting element.

The projector 3_2 is an example of a second projector. The projection image Img_2 is a composite image represented by composite light obtained by combining the image light emitted from the liquid crystal panels 100R, 100G, and 100B of the projector 3_2. Thus, the image light representing the projection image Img_2 is an example of second image light, and the liquid crystal panels 100R, 100G, and 100B of the projector 3_2 are examples of a second electro-optical device. The projection lens 2114 of the projector 3_2 is an example of a second projection optical member, and the optical path shifting element 230 of the projector 3_2 is an example of a second optical path shifting element.

Figure 3:
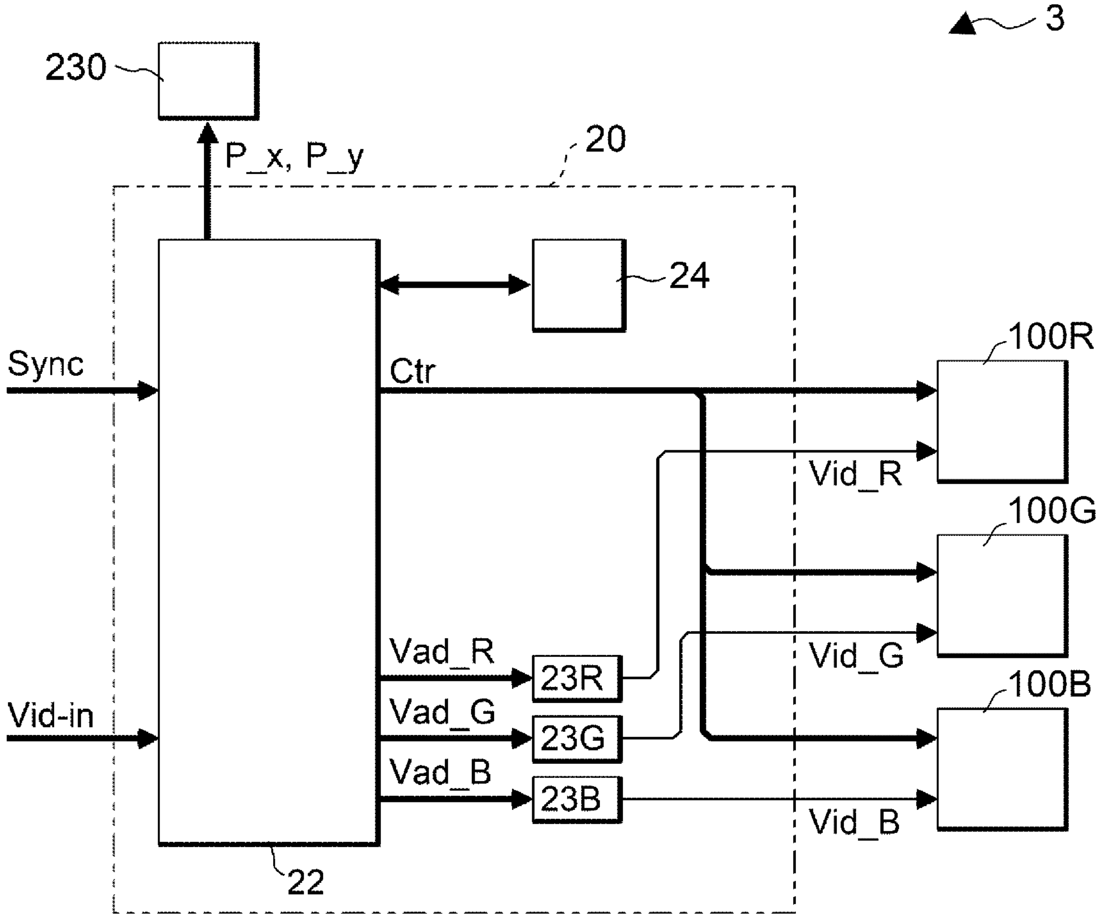
FIG. 3 is a block diagram illustrating an electrical configuration of the projector.

FIG. 3 is a block diagram illustrating an electrical configuration of the projector 3. As illustrated in FIG. 3, the projector 3 includes a display control circuit 20, the above-described liquid crystal panels 100R, 100G, and 100B, and the optical path shifting element 230.

Image data Vid-in is supplied from the host 2 in synchronization with a control signal Sync. The image data Vid-in designates a gray scale level of a pixel in an image to be displayed for each of RGB, using 8 bits, for example.

Note that the image data Vid-in from the host 2 is image data indicating the projection image Img_1, of the projection image Img, in the case of the projector 3_1, and is image data indicating the projection image Img_2, of the projection image Img, in the case of the projector 3_2. Further, the control signal Sync from the host 2 is common to the projectors 3_1 and 3_2.

Note that the pixel in the image designated by the image data Vid-in is referred to as an original image pixel, and the pixel of the liquid crystal panels 100R, 100G, and 100B to which the image data Vid-in is supplied is referred to as a panel pixel. Further, a position of a pixel, whose emission optical path has been shifted by the optical path shifting element 230, of the projection image projected onto the projection surface W is referred to as a projection position.

In the liquid crystal panels 100R, 100G, and 100B, the panel pixels are arrayed in a matrix in the vertical and lateral directions. In the embodiment, an array of the original image pixels whose gray scale levels are designated by the image data Vid-in is twice as large as an array of the panel pixels combined by the liquid crystal panels 100R, 100G, and 100B, in both the vertical direction and the lateral direction.

In the embodiment, a color image projected onto the projection surface is expressed by combining the image light transmitted through the liquid crystal panels 100R, 100G, and 100B. Thus, the pixel, which is the minimum unit of the color image, can be divided into a red sub-pixel by the liquid crystal panel 100R, a green sub-pixel by the liquid crystal panel 100G, and a blue sub-pixel by the liquid crystal panel 100B. However, when there is no need to specify the colors of the sub-pixels in the liquid crystal panels 100R, 100G, and 100B, or, for example, when handling only the brightness as a problem, the sub-pixels do not need to be referred to as sub-pixels. Therefore, in the description herein, the panel pixel is also used as a display unit of the liquid crystal panels 100R, 100G, and 100B.

The control signal Sync includes a vertical synchronization signal that instructs a start of vertical scanning of the image data Vid-in, a horizontal synchronization signal that instructs a start of horizontal scanning, and a clock signal that indicates a timing of one original image pixel in the image data Vid-in.

In addition to a processing circuit 22, conversion circuits 23R, 23G, and 23B, and a vertical scanning direction setting unit 24, the display control circuit 20 also includes a communication circuit and a camera that captures the projection image, which are not particularly illustrated.

The processing circuit 22 accumulates the image data Vid-in from a higher-level device for one or two or more frame periods, reads pixel data of the original image pixel corresponding to a unit period, and outputs the pixel data for each of RGB components. Note that, of the pixel data output from the processing circuit 22, the R component is denoted as pixel data Vad_R, the G component is denoted as pixel data Vad_G, and the B component is denoted as pixel data Vad_B.

In the projector 3, the projection position changes once every unit period obtained by dividing one frame period into four. Each of the unit periods is a period for causing a user to visually recognize an image obtained by reducing the resolution of the image of the one frame period designated by the image data Vid-in to one fourth of the original resolution. In the embodiment, the projection position is shifted once every unit period, and thus, when viewed in the four unit periods, the user is caused to visually recognize as if the original image is displayed.

The processing circuit 22 controls the projection position of the image light by the optical path shifting element 230 in each of the unit periods. More specifically, with respect to the optical path shifting element 230, the processing circuit 22 controls the shift in the X direction using a control signal P_x, and controls the shift in the Y direction using a control signal P_y.

Note that the projection position for each unit period, and, of the original image pixels designated by the image data Vid-id in correspondence to each of the projection positions, which of the original image pixels is expressed by the panel pixel will be described later in more detail.

Further, the processing circuit 22 also generates a control signal Ctr for controlling the liquid crystal panels 100R, 100G, and 100B once every unit period. The control signal Ctr includes a signal for setting the vertical scanning direction of a scanning line drive circuit 130.

The conversion circuit 23R converts the pixel data Vad_R into a data signal Vid_R of an analog voltage, and supplies it to the liquid crystal panel 100R. The conversion circuit 23G converts the pixel data Vad_G into a data signal Vid_G of an analog voltage, and supplies it to the liquid crystal panel 100G. The conversion circuit 23B converts the pixel data Vad_B into a data signal Vid_B of an analog voltage, and supplies it to the liquid crystal panel 100B.

Here, the liquid crystal panels 100R, 100G, and 100B will be described, before describing the vertical scanning direction setting unit 24. The liquid crystal panels 100R, 100G, and 100B only differ in the color of incident light, that is, in the wavelength of the incident light, and otherwise have the same structure. Thus, the liquid crystal panels 100R, 100G, and 100B will be generally described below using a reference numeral 100 without specifying the color.

Figure 4:
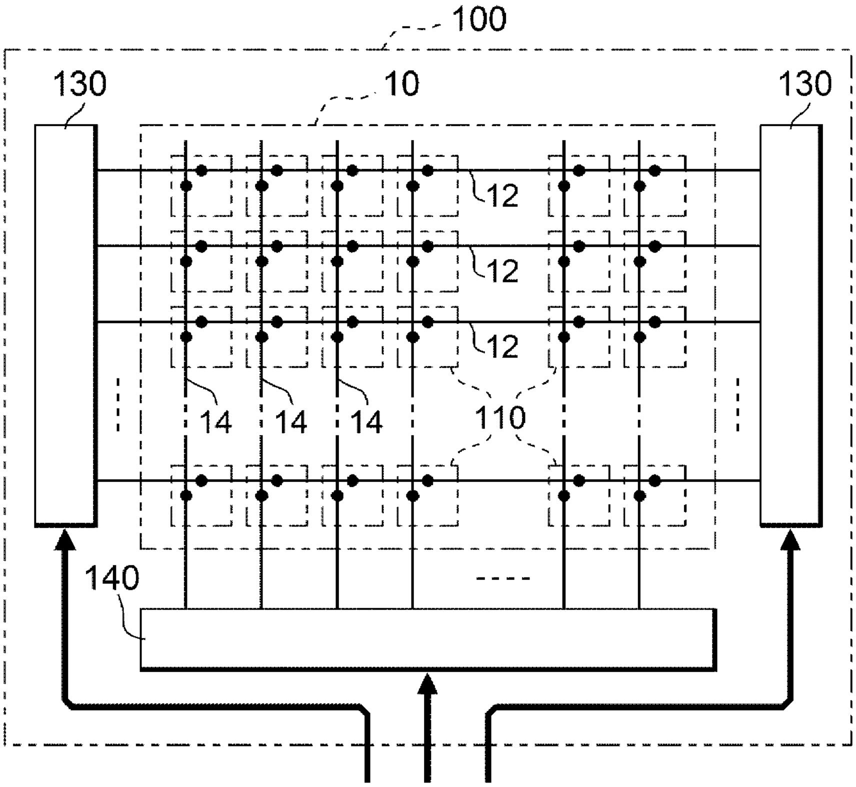
FIG. 4 is a block diagram illustrating an electrical configuration of a liquid crystal panel in the projector.

FIG. 4 is a block diagram illustrating an electrical configuration of the liquid crystal panel 100. In the liquid crystal panel 100, the scanning line drive circuits 130 and a data line drive circuit 140 are provided at the periphery of a display region 10.

In the display region 10 of the liquid crystal panel 100, pixel circuits 110 are arrayed in a matrix. More specifically, in the display region 10, a plurality of scanning lines 12 are provided extending in the lateral direction in the drawing, and a plurality of data lines 14 are provided extending in the vertical direction, while the data lines 14 are electrically insulated from the scanning lines 12. The pixel circuits 110 are provided in a matrix corresponding to the intersections between the plurality of scanning lines 12 and the plurality of data lines 14.

When the number of the scanning lines 12 is m and the number of the data lines 14 is n, the pixel circuits 110 are arrayed in a matrix of m rows and n columns. m and n are each an integer of 2 or greater. With respect to the scanning lines 12 and the pixel circuits 110, in order to distinguish the rows of the matrix from each other, the rows may be referred as a first, second, third . . . (m−1)th, and m-th row in ascending order from the top in the drawing. Similarly, with respect to the data lines 14 and the pixel circuits 110, in order to distinguish the columns of the matrix from each other, the columns may be referred as a first, second, third . . . (n−1)th, and n-th column in ascending order from the left in the drawing.

The scanning line drive circuit 130 sequentially selects the scanning lines 12 one by one in both directions in the unit period to be described later, under the control of the display control circuit 20, and supplies a scanning signal corresponding to the selection to the scanning line 12.

Figure 10:
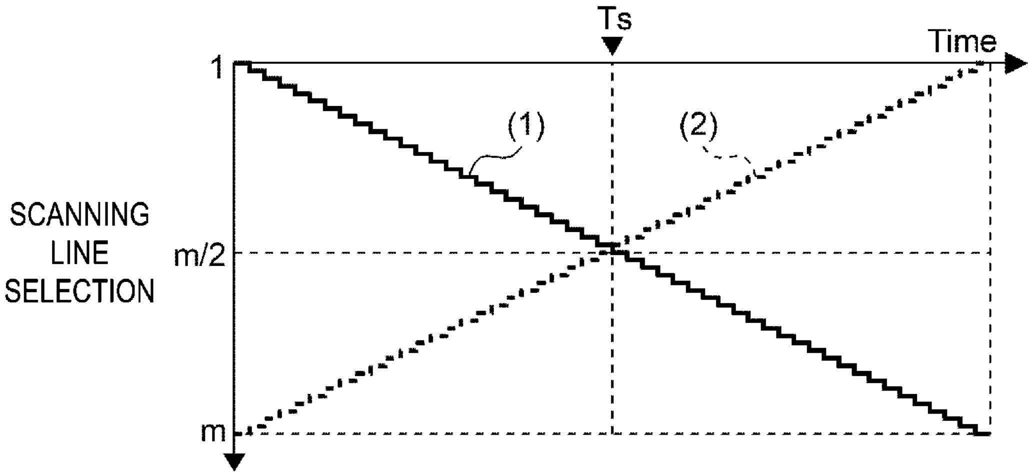
FIG. 10 is a diagram illustrating a selection order and the like of scanning lines in a vertical scanning direction.

FIG. 10 is a diagram illustrating a transition in the selection of the scanning lines 12. Specifically, when the vertical scanning direction is set to the forward direction in a unit period f, the scanning line drive circuit 130 selects the scanning lines 12 in the order of the first, second, third . . . (m−2)th, (m−1)th, and m-th rows, as indicated by a solid line (1), and when the vertical scanning direction is set to the reverse direction, selects the scanning lines 12 in the order of the m-th, (m−1)th, (m−2)th . . . third, second, and first rows, as indicated by a broken line (2).

Note that, in the embodiment, the vertical scanning direction is the forward direction in an initial state. Further, the scanning line drive circuit 130 sets the scanning signal to the selected scanning line 12 to the H level, and sets the scanning signal to the scanning lines 12 other than the selected scanning line 12 to the L level.

The configuration of the scanning line drive circuit 130 in which the vertical scanning direction can be switched between the forward direction and the reverse direction is described in JP-A-2002-313092, for example, and a further description will thus be omitted here.

The data line drive circuit 140 latches one row of the data signals of any one of the colors, in the processing circuit 22, and, in a period in which the scanning signal to the scanning line 12 is set to the H level, outputs the data signals to the pixel circuit 110 located at the corresponding scanning line 12, via the data line 14.

Figure 5:
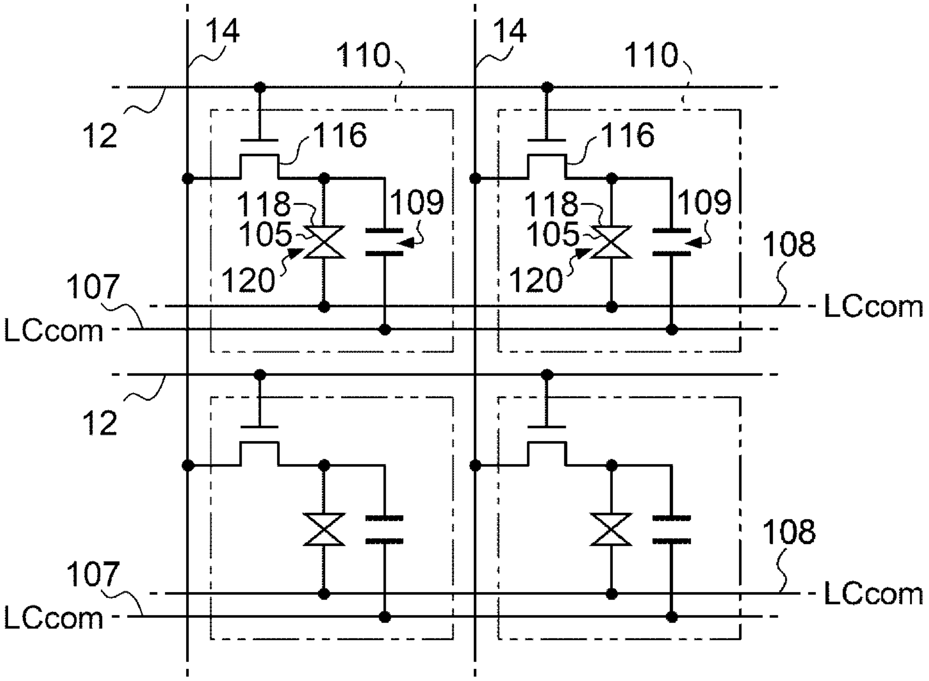
FIG. 5 is a diagram illustrating a configuration of a pixel circuit in the liquid crystal panel.

FIG. 5 is a diagram illustrating an equivalent circuit of a total of four of the pixel circuits 110, in two rows and two columns, corresponding to the intersections between two of the adjacent scanning lines 12 and two of the adjacent data lines 14.

As illustrated in the drawing, the pixel circuit 110 includes a transistor 116 and a liquid crystal element 120. The transistor 116 is, for example, an n-channel thin film transistor. In the pixel circuit 110, a gate node of the transistor 116 is coupled to the scanning line 12, a source region thereof is coupled to the data line 14, and a drain region thereof is coupled to a pixel electrode 118 having a square shape in plan view.

A common electrode 108 is provided commonly for all the pixels and faces the pixel electrodes 118. A voltage LCcom is applied to the common electrode 108. Then, as is well known, a liquid crystal 105 is interposed between the pixel electrodes 118 and the common electrode 108. Thus, the liquid crystal element 120, in which the liquid crystal 105 is interposed between the pixel electrodes 118 and the common electrode 108, is formed for each of the pixel circuits 110.

Further, a storage capacitor 109 is provided in parallel with the liquid crystal element 120. One end of the storage capacitor 109 is coupled to the pixel electrode 118, while the other end thereof is coupled to a capacitor line 107. A temporally constant voltage, for example, the same voltage LCcom as the voltage applied to the common electrode 108, is applied to the capacitor line 107. Since the pixel circuits 110 are arrayed in the matrix in the lateral direction, which is the extending direction of the scanning lines 12, and in the vertical direction, which is the extending direction of the data lines 14, the pixel electrodes 118 included in the pixel circuits 110 are also arrayed in the lateral direction and the vertical direction.

In the scanning line 12 in which the scanning signal is set to the H level, the transistor 116 of the pixel circuit 110 provided corresponding to that scanning line 12 is turned on. Since the data line 14 and the pixel electrode 118 are electrically coupled to each other as a result of the transistor 116 being turned on, the data signal supplied to the data line 14 reaches the pixel electrode 118 through the transistor 116 that has been turned on. When the scanning line 12 is set to the L level, the transistor 116 is turned off, but the voltage of the data signal, which has reached the pixel electrode 118, is retained by capacitive properties of the liquid crystal element 120 and the storage capacitor 109.

As is well known, in the liquid crystal element 120, the liquid crystal molecular alignment changes in accordance with the electric field generated by the pixel electrode 118 and the common electrode 108. Thus, the liquid crystal element 120 has a transmittance corresponding to the effective value of the applied voltage.

Note that a region functioning as the pixel in the liquid crystal element 120, that is, a region having a transmittance corresponding to the effective value of the voltage, is a region in which the pixel electrode 118 and the common electrode 108 overlap each other when the liquid crystal panel 100 is viewed in plan view. Since the pixel electrode 118 has the square shape in plan view, the shape of the pixel of the liquid crystal panel 100 is also a square shape.

Further, in the embodiment, it is assumed that the normally black mode is employed in which the transmittance increases as the voltage applied to the liquid crystal element 120 increases.

In one unit period, an operation of supplying the data signal to the pixel electrode 118 of the liquid crystal element 120 is performed in order of the first, second, third . . . m-th rows when the vertical scanning direction is the forward direction, and is performed in the order m-th, (m−1)th, (m−2)th . . . first rows when the vertical scanning direction is the reverse direction. Irrespective of the direction, the voltage corresponding to the data signal is retained in each of the liquid crystal elements 120 of the pixel circuits 110 arrayed in the m rows and n columns, each of the liquid crystal elements 120 has a target transmittance, and the transmission image of the corresponding color is generated by the liquid crystal elements 120 arrayed in the m rows and n columns.

In this way, the transmission image is generated for each of RGB, and the composite light forming the color image obtained by combining RGB is projected onto the projection surface W.

The pixel data Vad_R, Vad_G, and Vad_B of the original image pixel output from the processing circuit 22 corresponding to one unit period are the pixel data of the original image pixel corresponding to that unit period. Thus, in that unit period, the composite light forming the color composite image corresponding to the projection position is projected at the corresponding projection position.

As described above, the array of the original image pixels in the image data Vid-in is twice as large in both the vertical direction and the lateral direction compared with the m rows and n columns in which the panel pixels are arrayed in the liquid crystal panels 100R, 100G, and 100B.

In other words, the array of the panel pixels is half the size of the array of the original image pixels in both the vertical direction and the lateral direction. Here, in the embodiment, in the one frame period, the one panel pixel is shifted at a total of four positions, namely, two positions in the vertical direction times two positions in the lateral direction, so that the one panel pixel is visually recognized as if representing four of the original image pixels set by the image data Vid-in.

Figure 6:
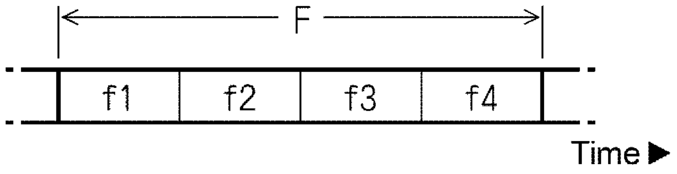
FIG. 6 is a diagram illustrating a frame period and unit periods in the projector.

FIG. 6 is a diagram for describing a relationship between the frame period and the unit periods in the embodiment. As illustrated in FIG. 6, in the embodiment, one frame period (F) is divided into four unit periods f1, f2, f3, and f4.

The one frame period is a period in which one frame of the image indicated by the image data Vid-in is supplied from the host 2. When the frequency of the vertical synchronization signal included in the control signal Sync is 60 Hz, the one frame period is a period of 16.7 milliseconds. In this case, the length of each of the unit periods is ¼ of the length of the one frame period, which is 4.17 milliseconds.

Figure 7:
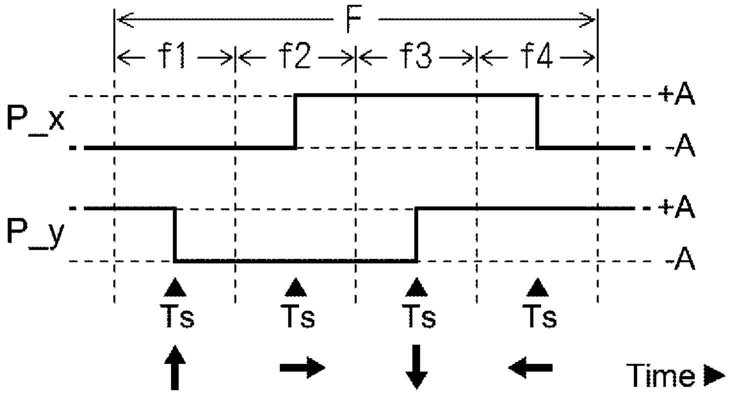
FIG. 7 is a diagram illustrating an operation of an optical path shifting element according to the embodiment.

FIG. 7 is a diagram illustrating an example of waveforms of the control signals P_x and P_y supplied to the optical path shifting element 230.

The optical path shifting element 230 shifts the image light projected onto the projection surface W in the X direction and the Y direction with respect to the projection surface. For convenience, an amount of the shift will be described in terms of the size of the pixel projected onto the projection surface W, that is, the size of the panel pixel.

Each of the control signals P_x and P_y has a level of one of two values of +A or −A in the unit periods f1 to f4. In the embodiment, the levels of the control signals P_x and P_y change at a midpoint of the unit period. The midpoint is a timing at which the (2/m)th scanning line 12 is selected, regardless of whether the vertical scanning direction is the forward direction or the reverse direction.

For convenience of description, of the unit period f1 in the frame period, the projection position after the midpoint is set as a reference position. In other words, when the level of the control signal P_x is −A and the level of the control signal P_y is −A, the optical path shifting element 230 causes the projection position to be the reference position.

When the level of the control signal P_y is +A, the optical path shifting element 230 shifts the projection position from the reference position by half of the panel pixel in the X direction, and when the level of the control signal P_y is +A, the optical path shifting element 230 shifts the projection position from the reference position by half of the panel pixel in the Y direction.

Thus, for example, when the level of the control signal P_x is +A and the level of the control signal P_y is +A, the optical path shifting element 230 shifts the projection position from the reference position by half of the panel pixel in each of the X direction and the Y direction.

Note that arrows illustrated at the midpoints in each of the unit periods in FIG. 7 indicate in which direction the projection position is shifted when the levels of the control signals P_x and P_y change at the midpoint.

Next, a description will be made as to which original image pixel among the original image pixels of the image data Vid-in is expressed by the panel pixel of the liquid crystal panel 100, in the frame period.

Note that the panel pixel expressing the given original image pixel means that the panel pixel is in a state of having a transmittance designated by the pixel data corresponding to the original image pixel.

Figure 8:
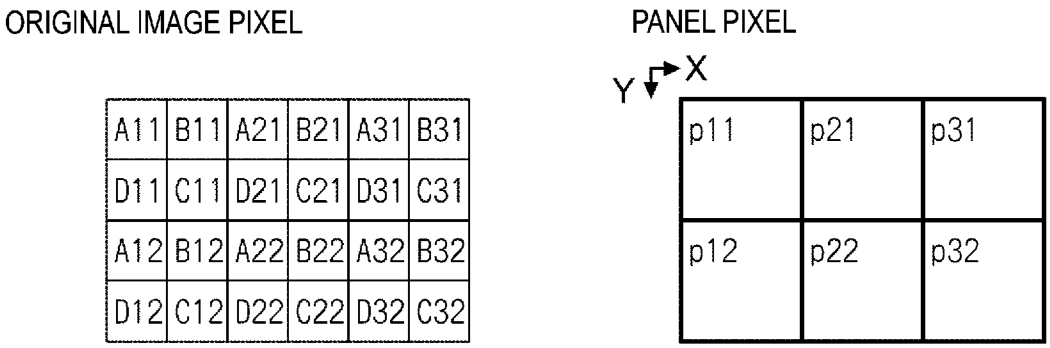

A left field in FIG. 8 is a diagram in which, in order to describe the array of the original image pixels, only a part of the video image designated by the image data Vid-in is extracted. Further, a right field in FIG. 8 is a diagram illustrating the array of the panel pixels corresponding to the array of the original image pixels in the left field.

Note that, in the left field in FIG. 8, in order to distinguish the original image pixels of the image data Vid-in, for convenience, A11, B11, A21, B21, A31, and B31 are respectively assigned, as reference signs, to the original image pixels of the first row. Similarly, reference signs are also respectively assigned to the second row, as illustrated in FIG. 8.

In the right field of FIG. 8, in order to distinguish the panel pixels, for convenience, p11, p21, and p31 are assigned, as reference signs, to the panel pixels of the first row, and p12, p22, and p32 are assigned to the panel pixels of the second row.

Figure 9:
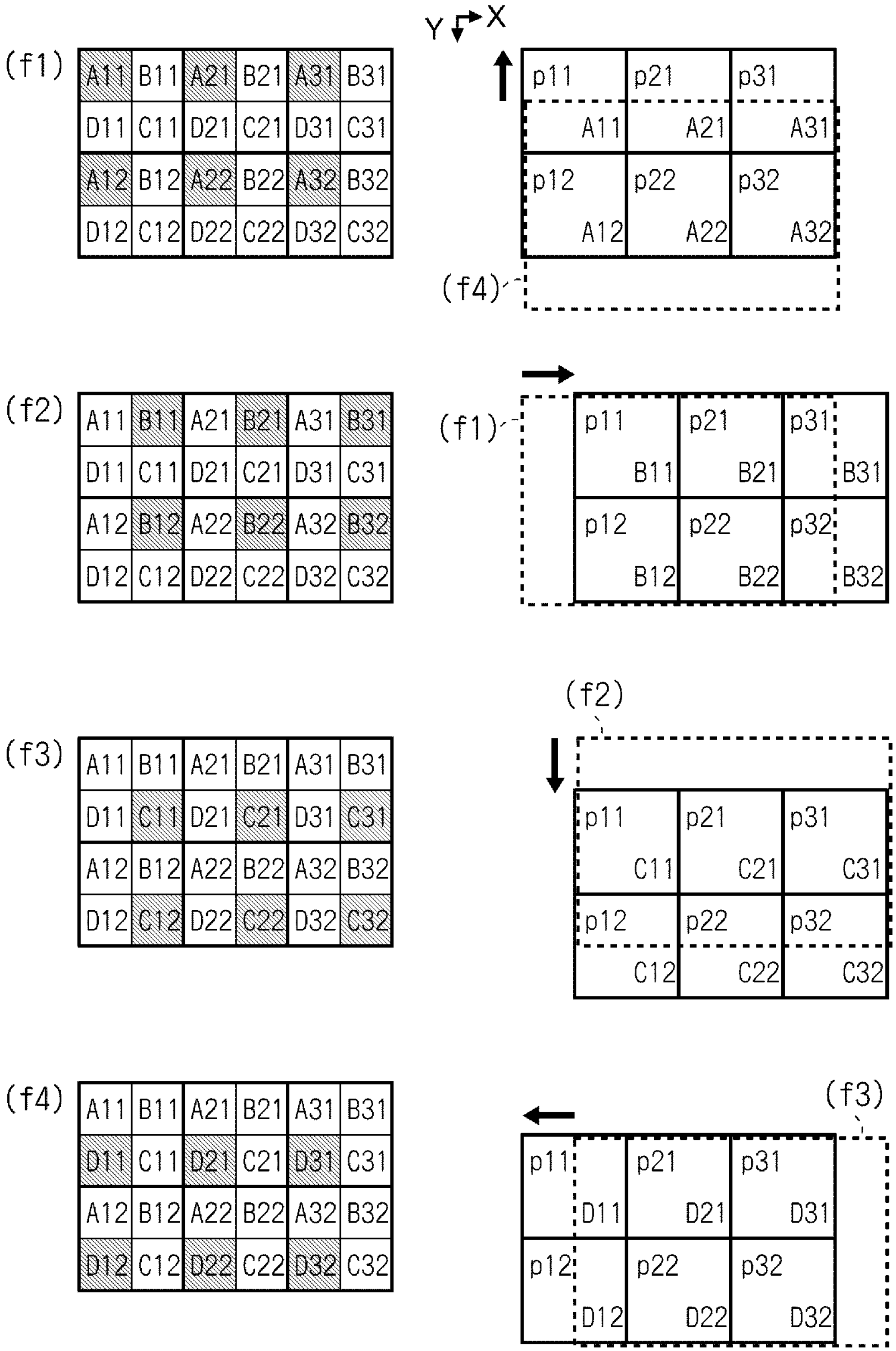
FIG. 9 is a diagram illustrating relationships among the original image pixels, the panel pixels, and projection positions in frame periods.

FIG. 9 is a diagram illustrating which of the original image pixels is expressed by the panel pixel at which of the projection positions, in the projector 3 according to the embodiment. More specifically, FIG. 9 is a diagram illustrating at which projection positions the original image pixels in the left field of FIG. 8 are expressed by the six panel pixels in FIG. 8 in the unit periods f1 to f4 of the frame period.

As illustrated in FIG. 9, in the unit period f1, the panel pixels p11, p21, p31, p12, p22, and p32 respectively express the hatched image pixels A11, A21, A31, A12, A22, and A32.

At the midpoint of the unit period f1, the optical path shifting element 230 shifts the projection position from the projection position in the unit period f4 indicated by a dashed line, by an amount corresponding to 0.5 panel pixels in the upward direction in FIG. 9 (the direction opposite to the Y direction), and causes this to be the reference position.

In the subsequent unit period f2, the panel pixels p11, p21, p31, p12, p22, and p32 respectively express the hatched original image pixels B11, B21, B31, B12, B22, and B32.

At the midpoint of the unit period f2, the optical path shifting element 230 shifts the projection position from the projection position in the unit period f1 indicated by a dashed line, by 0.5 panel pixels in the rightward direction in FIG. 9 (the X direction).

In the unit period f3, the panel pixels p11, p21, p31, p12, p22, and p32 respectively express the hatched original image pixels C11, C21, C31, C12, C22, and C32.

At the midpoint of the unit period f3, the optical path shifting element 230 shifts the projection position from the projection position in the unit period f2 indicated by a dashed line, by an amount corresponding to 0.5 panel pixels in the downward direction in FIG. 9 (the Y direction).

In the unit period f4, the panel pixels p11, p21, p31, p12, p22, and p32 respectively express the hatched original image pixels D11, D21, D31, D12, D22, and D32.

At the midpoint of the unit period f4, the optical path shifting element 230 shifts the projection position from the projection position in the unit period f3 indicated by a dashed line, by an amount corresponding to 0.5 panel pixels in the leftward direction in FIG. 9 (the direction opposite to the X direction).

Note that in the embodiment, the shift direction of the projection position in the optical path shifting element 230 does not change, irrespective of the vertical scanning direction.

The vertical scanning direction setting unit 24 of the projector 3 will be described. The vertical scanning direction setting unit 24 sets the vertical scanning direction of the scanning line drive circuit 130 in the processing circuit 22. The vertical scanning direction setting unit 24 determines the vertical scanning direction of the scanning line drive circuit 130 as follows, for example, and sets the vertical scanning direction in the processing circuit 22.

For example, the user performs a specific operation, such as long-pressing a certain switch on one of the two projectors 3_1 and 3_2. The processing circuit 22 of the projector 3 on which the specific operation is performed causes the corresponding projector 3 to project the image light representing a specific pattern, such as an entirely white screen, for example, and instructs the other projector 3 to project the image light representing a different pattern, via the communication circuit.

The processing circuit 22 of the projector 3 identifies in which part, of the projection image Img, the pattern represented by the image light projected by the projector 3 is being displayed, by determining based on a result captured by the camera. For example, when, in the projection image Img, the image light representing the entirely white screen as the specific pattern is projected on the upper portion of the projection surface W, the processing circuit 22 identifies that the corresponding projector is the projector 3_1 that projects the image light representing the projection image Img_1.

The processing circuit 22 of the projector 3 on which the specific operation has been performed notifies the other projector 3 about the portion of the projection image Img other than the portion identified by the corresponding projector 3. In this way, as in the embodiment, when the number of the projectors 3 constituting the projection system 1 is "2", the projector 3 other than the projector 3 on which the specific operation is performed is identified as the projector 3_2 which projects the image light representing the projection image Img_2, which is the notified portion. In the projector 3 responsible for projecting the projection image Img_1, the vertical scanning direction is set to the forward direction in the processing circuit 22, and in the projector 3 responsible for projecting the projection image Img_2, the vertical scanning direction is set to the reverse direction in the processing circuit 22.

Note that the processing circuit 22 supplies the control signal Ctr that is the set vertical scanning direction to the liquid crystal panels 100R, 100G, and 100B.

Further, when it has been identified, in each of the projectors 3, onto which portion the projector 3 is responsible for performing the projection, subsequently, in the projector 3 on which the specific operation is performed by the user, the processing circuit 22 causes the corresponding projector 3 to project the image light representing the specific pattern, such as the entirely white screen, and also instructs the other projector to project the image light representing the same specific pattern.

When all the projectors 3 project the image light representing the same specific pattern, the overlapping region Ovr becomes brighter than the other regions. For this reason, using a result captured by the built-in camera, the processing circuit 22 of the projector 3_1 performs correction processing on data corresponding to the overlapping region Ovr in the image data Vid-in, so that the brightness of the overlapping region Ovr matches the brightness of the portion of the projection image Img_1 excluding the overlapping region Ovr.

Note that the reverse direction may be set as the vertical scanning direction in the projector 3_1, and the forward direction may be set as the vertical scanning direction in the other projector 3_2. That is, when the number of the projectors 3 constituting the projection system 1 is "2", it is sufficient that the vertical scanning direction of the one projector 3_1 and the vertical scanning direction of the other projector 3_2 be set to be opposite to each other.

Here, as illustrated in FIG. 7 or FIG. 10, the timing at which the optical path is shifted by the optical path shifting element 230 is a midpoint Ts of the unit period.

At a timing of writing the upper portion of the screen of the liquid crystal panel 100, namely, at the timing of writing the first row, the projection position is a projection position corresponding to the immediately preceding unit period. Subsequently, at the midpoint Ts, the projection position is changed to the projection position of the corresponding unit period. Thus, in a period corresponding to half of the unit period, the upper portion of the screen of the liquid crystal panel 100 is visually recognized at the projection position of the immediately preceding unit period, and is then visually recognized at the projection position of the corresponding unit period in a period corresponding to half of the unit period.

At the timing of writing the center portion of the screen of the liquid crystal panel 100, namely, at the timing of writing the (m/2)th row, the projection position is a projection position corresponding to the corresponding unit period. Subsequently, the projection position is not changed until the writing in the subsequent unit period. Thus, the center portion of the screen of the liquid crystal panel 100 is visually recognized at the projection position of the corresponding unit period in a period corresponding to substantially the entire unit period.

At the timing of writing the lower portion of the screen of the liquid crystal panel 100, namely, at the timing of writing the m-th row, the projection position is the projection position of the corresponding unit period. Subsequently, at the midpoint Ts of the subsequent unit period, the projection position is changed to the projection position corresponding to the subsequent unit period. Thus, the lower portion of the screen of the liquid crystal panel 100 is visually recognized at the projection position of the corresponding unit period in a period corresponding to half of the unit period, and is visually recognized at the projection position of the subsequent unit period in a period corresponding to half of the unit period.

Therefore, for example, when the image light representing the projection image Img_1 is projected by the projector 3_1 and the image light representing the projection image Img_2 is projected by the projector 3_2, if the vertical scanning direction in the projector 3_1 and the vertical scanning direction in the projector 3_2 are the same direction, such as the forward direction, for example, the following problem occurs.

This problem will be described below. For example, the image projected when the original image pixel A11 has the highest gray scale level in the unit period f1, the original image pixel B11 has the lowest gray scale level in the unit period f2, the original image pixel C11 has the highest gray scale level in the unit period f3, and the original image pixel D11 has the lowest gray scale level in the unit period f4, as illustrated in the upper column of FIG. 11, will be described. In other words, in this case, the panel pixel p11 alternately and repeatedly expresses the highest gray scale level and the lowest gray scale level by writing in the unit periods f1 to f4.

Here, attention is paid to the lowest gray scale level of the original image pixel B11 expressed by the writing in the unit period f2. When the panel pixel p11 is at the upper portion of the screen of the liquid crystal display panel 100, a lowest transmittance portion by the panel pixel p11 is visually recognized at the projection position of the immediately preceding unit period f1 and is subsequently visually recognized at the projection position of the unit period f2.

Figure 11:
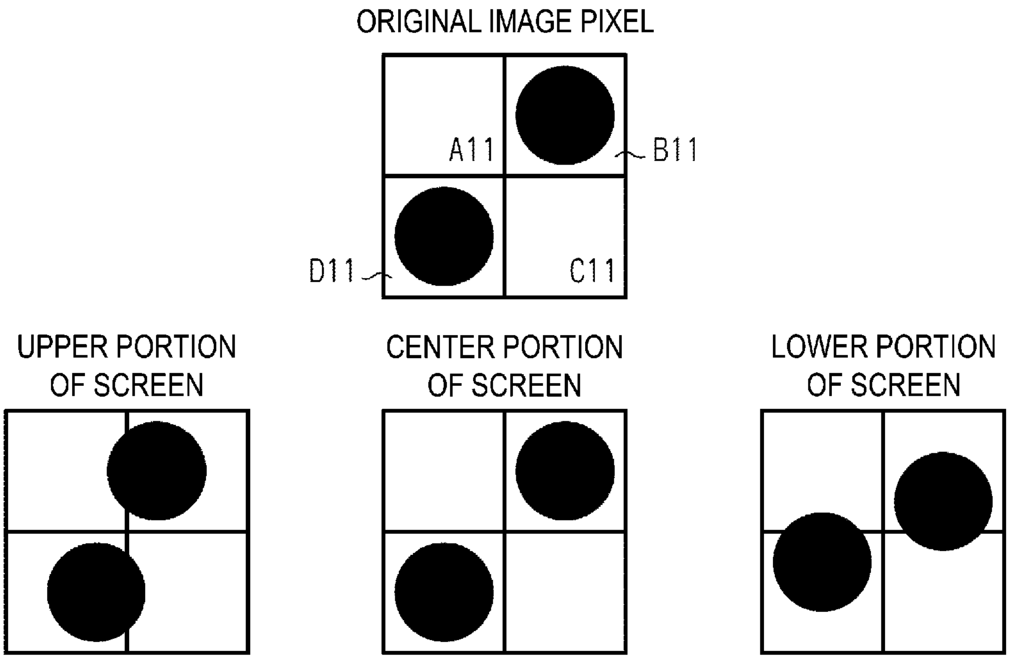
FIG. 11 is a diagram for describing pixels visually recognized in each of portions of a screen.

Thus, as illustrated at the lower left in FIG. 11, the center of gravity of the lowest transmittance portion in the panel pixel p11 by the writing in the unit period f2 is displaced, with respect to the projection position of the corresponding unit period f2, in a direction of a viewing position of the immediately preceding unit period f1, namely, is displaced in the leftward direction. Note that in FIG. 11, the lowest transmittance portion is indicated by a black circle in order to indicate the position of the center of gravity. Further, in FIG. 11, in order to indicate the movement of the center of gravity, the shift amount does not match the amount corresponding to 0.5 panel pixels.

Further, attention is paid to the lowest gray scale level of the original image pixel D11 expressed in the unit period f4. When the panel pixel p11 is at the upper portion of the screen of the liquid crystal display panel 100, the lowest transmittance portion by the panel pixel p11 is visually recognized at the projection position of the immediately preceding unit period f3 and is subsequently visually recognized at the projection position of the unit period f4. Thus, the center of gravity of the lowest transmittance portion by the writing of the panel pixel p11 in the unit period f4 is displaced, with respect to the projection position in the corresponding unit period f4, in a direction of a viewing position of the preceding unit period f3, namely is displaced in the rightward direction.

When the panel pixel p11 is at the center portion of the screen, the transmittance portion due to the writing in the unit period is visually recognized at the projection position in the corresponding unit period over a period corresponding to substantially the entire unit period. Thus, as illustrated at the lower center of FIG. 11, the center of gravity of the lowest transmittance portion by the writing of the panel pixel p11 in the unit period f2 is the projection position of the unit period f2, and the center of gravity of the lowest transmittance portion by the writing of the panel pixel p11 in the unit period f4 is the projection position of the unit period f4.

When the panel pixel p11 is at the lower portion of the screen, the transmittance portion due to the writing in the unit period is visually recognized at the projection position in the unit period and is then visually recognized at the projection position in the subsequent unit period. Thus, as illustrated at the lower right of FIG. 11, the center of gravity of the lowest transmittance portion by the writing of the panel pixel p11 in the unit period f2 is displaced, with respect to the projection position of the corresponding unit period f2, in the downward direction, which is the direction of the viewing position in the subsequent unit period f3. Further, the center of gravity of the lowest transmittance portion by the writing of the panel pixel p11 in the unit period f4 is displaced, with respect to the projection position of the corresponding unit period f4, in the upward direction which is the direction of the viewing position in the subsequent unit period f1.

The overlapping region Ovr is the lower portion of the screen when viewed from the projection image Img_1, and is the upper portion of the screen when viewed from the projection image Img_2.

Figure 12:
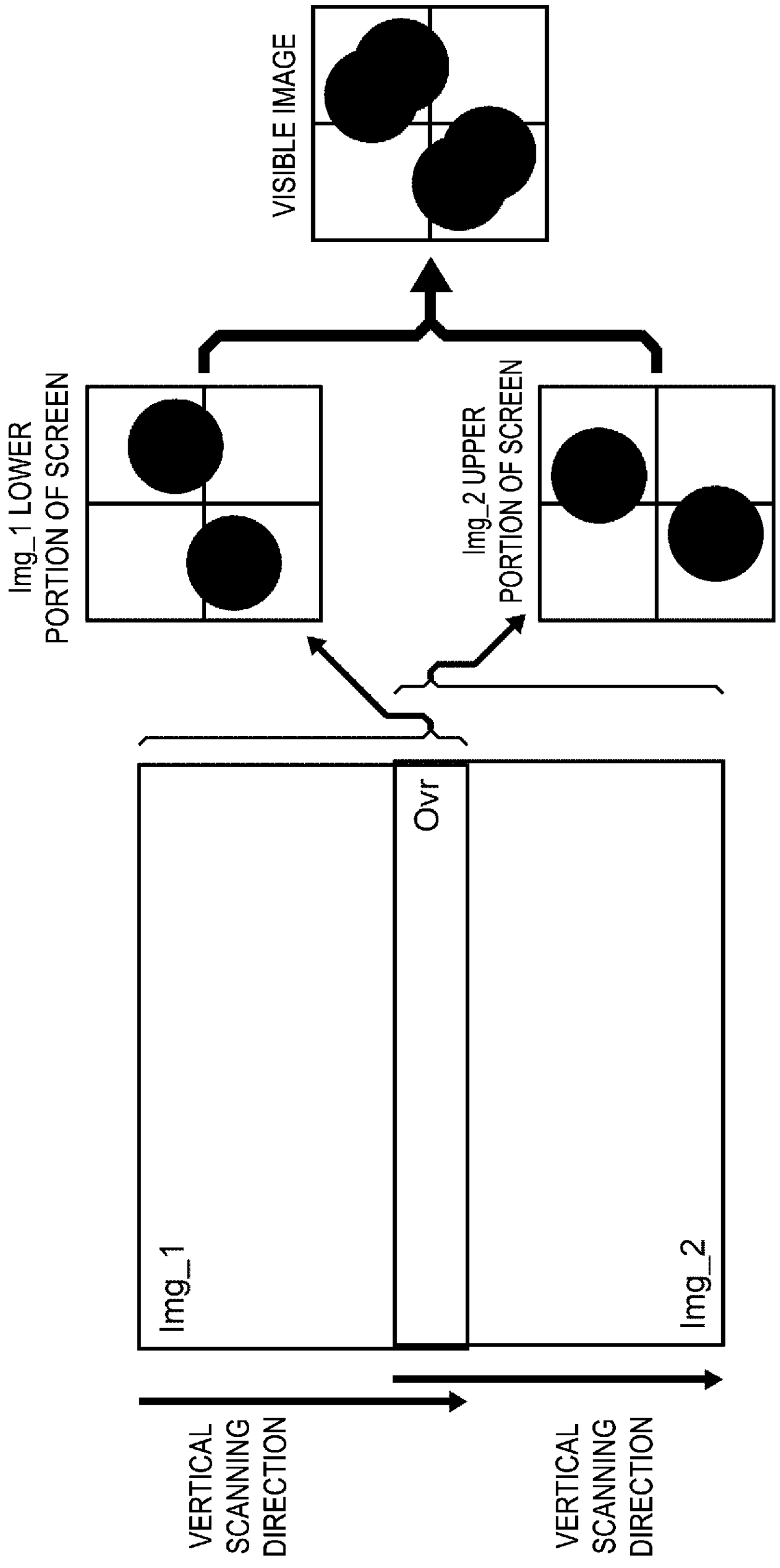
FIG. 12 is an explanatory diagram of display quality of a projection system according to a comparative example.

When the vertical scanning directions of the projection images Img_1 and Img_2 are both the forward direction, as illustrated in FIG. 12, the centers of gravity of the projection pixels in the overlapping region Ovr are displaced between the projection image Img_1 of the lower portion of the screen and the projection image Img_2 of the upper portion of the screen. For this reason, in the overlapping region Ovr where the projection images Img_1 and Img_2 are combined, due to the displacement between the centers of gravity of the projection pixels, the projection images Img_1 and Img_2 are visually recognized in a blurred manner, and deterioration in display quality occurs.

Figure 13:
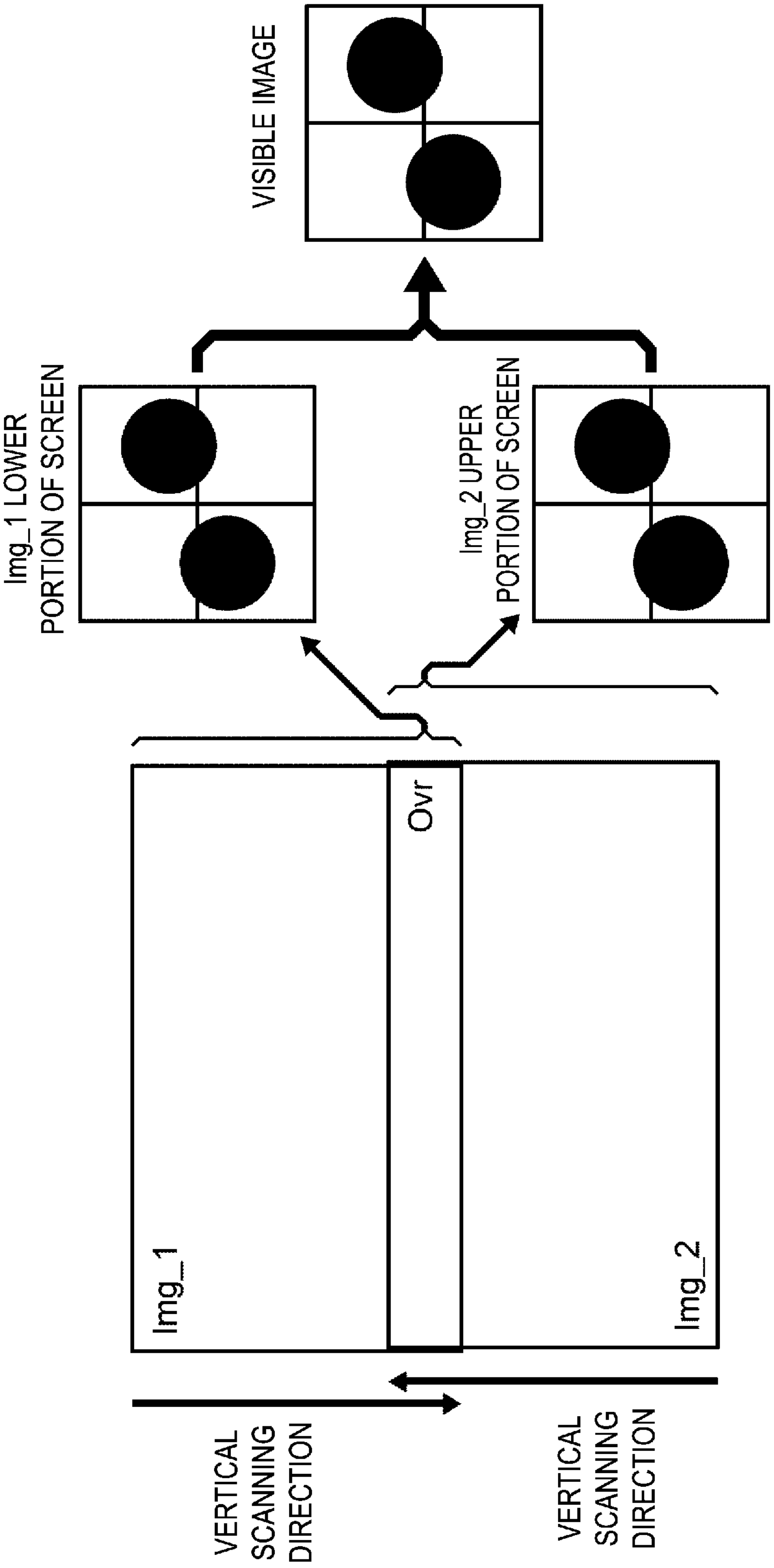
FIG. 13 is an explanatory diagram of display quality of the projection system according to the embodiment.

In contrast, in the embodiment, as illustrated in FIG. 13, the vertical scanning direction is set to the forward direction in the projector 3_1 which projects the image light representing the projection image Img_1, and is set to the reverse direction in the projector 3_2 which projects the image light representing the projection image Img_2. Thus, the upper portion of the screen of the projection image Img_2 is displaced in the same manner as the lower portion of the screen of the projection image Img_1. In other words, in the embodiment, in the overlapping region Ovr, the displacement of the centers of gravity of the projection pixels in the lower portion of the screen of the projection image Img_1 and the displacement of the centers of gravity of the projection pixels in the upper portion of the screen of the projection image Img_2 are aligned.

Thus, in the embodiment, it is possible to suppress deterioration in display quality in the overlapping region Ovr, compared with a case in which the vertical scanning directions of the projection images Img_1 and Img_2 are the same.

Note that, in the embodiment, the vertical scanning direction is set to the forward direction in the projector 3_1 and is set to the reverse direction in the projector 3_2. However, the vertical scanning direction may be set to the reverse direction in the projector 3_1 and set to the forward direction in the projector 3_2. In other words, it is sufficient that the vertical scanning directions be set to be opposite directions in the projectors 3_1 and 3_2.

In the embodiment, the timing at which the optical path shift is changed by the optical path shifting element 230 is the midpoint Ts of the unit period, but may be a timing other than this. For example, the timing may be a timing between the unit periods, more specifically, a timing before the first scanning line 12 is selected in the unit period or a timing after the last scanning line 12 is selected in the unit period.

In the embodiment, the vertical scanning direction setting unit 24 is provided in the display control circuit 20 of the projector 3, and when the specific operation is performed on the projector 3_1, for example, the vertical scanning direction setting unit 24 of the projector 3_1 sets the vertical scanning direction to be opposite to the vertical scanning direction of the vertical scanning direction setting section 24 of the other projector 3_2, but the configuration is not limited thereto.

For example, the host 2 that supplies the image data representing the projection image Img_1 to the projector 3_1 and supplies the image data representing the projection image Img_2 to the projector 3_2 may have a function corresponding to the vertical scanning direction setting unit 24. In this configuration, the host 2 sets the vertical scanning direction to the forward direction for the projector 3_1 and to the reverse direction for the projector 3_2, respectively.

In accordance with this setting, the processing circuit 22 of the projector 3_1 outputs the control signal Ctr that causes the vertical scanning direction of the liquid crystal panels 100R, 100G, and 100B to be the forward direction. On the other hand, the processing circuit 22 of the projector 3_2 outputs the control signal Ctr that causes the vertical scanning directions of the liquid crystal panels 100R, 100G, and 100B to be the reverse direction. According to such a configuration, the display control circuit 20 of each of the projectors 3 does not need to include the vertical scanning direction setting unit 24.

Note that the host 2 having the function corresponding to the vertical scanning direction setting unit 24 is an example of an information processing device.

Further, in the embodiment, the number of the projectors 3 constituting the projection system 1 is "2", but the number may be "3" or more.

Figure 14:
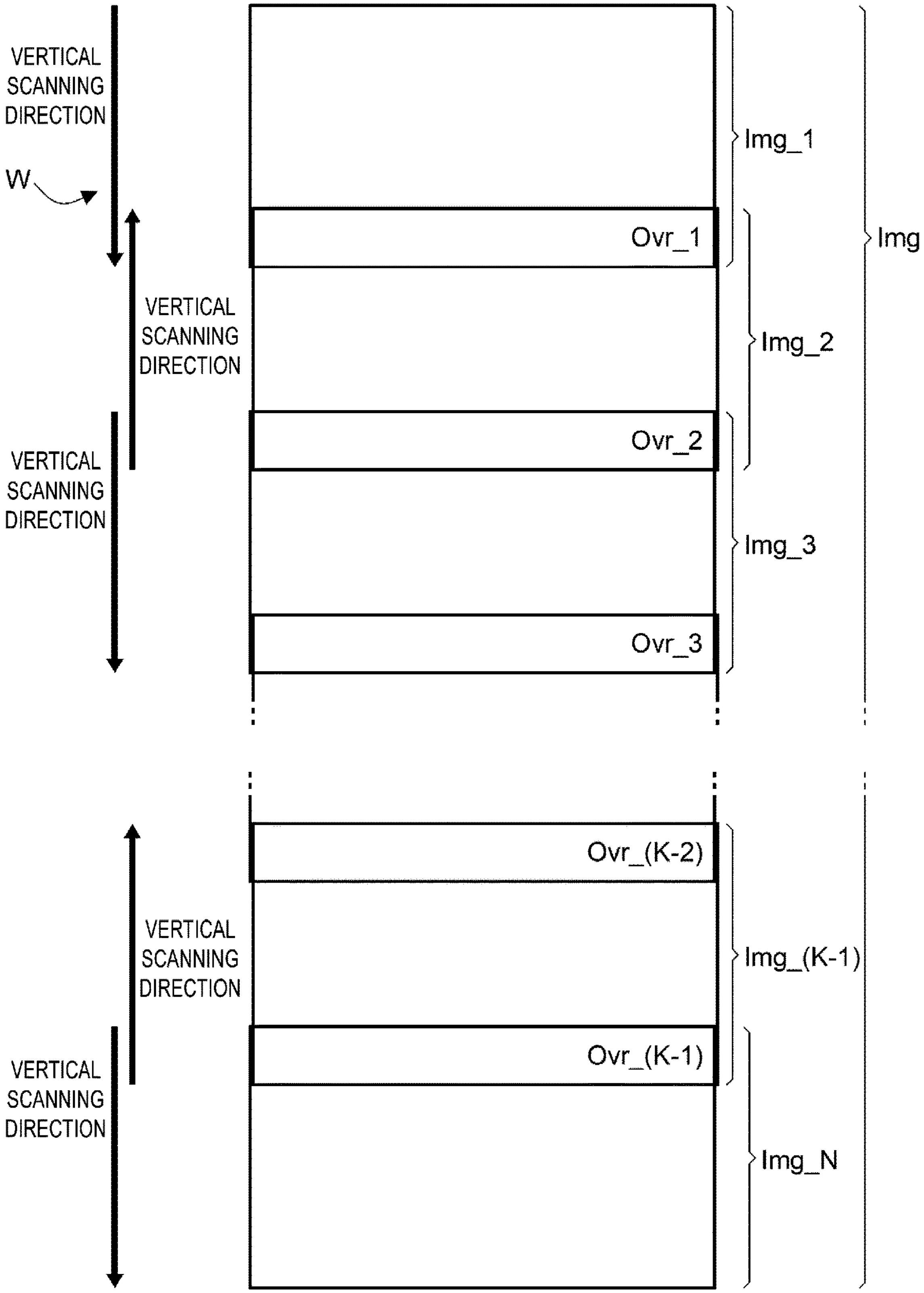
FIG. 14 is a diagram illustrating the projection system according to a modified example.

FIG. 14 is a diagram illustrating a projection image Img represented by the image light projected when the number of the projectors 3 constituting the projection system 1 according to a modified example is "K". Note that K is an integer equal to or greater than 3.

In this example, the projection image Img represented by the image light projected on the projection surface W is expressed by combining the projection images Img_1, Img_2, Img_3 . . . Img_(K−1), and Img_K. Note that although not particularly illustrated, the images Img_1, Img_2, Img_3 . . . Img_(K−1), and Img_K are sequentially projected by the projectors 3_1, 3_2, 3_3 . . . 3_(K−1), and 3_K. Note that the overlapping region of the projection images Img_1 and Img_2 is Ovr 1, the overlapping region of the projection images Img_2 and Img_3 is Ovr 2, and similarly, the overlapping region of the projection images Img_(K−1) and Img_K is Ovr (K−1).

In such a modified example, the vertical scanning directions are set to be opposite to each other in the two projectors 3 that project the image light representing adjacent images.

Note that as a method of setting the vertical scanning directions to be opposite to each other, for example, when the user performs a specific operation on any one of the projectors 3 among the K projectors 3, after it is ascertained, as in the embodiment, which of the images represented by the projection light, among the projection images Img_1 to Img_K, is being projected by the corresponding one of the projectors 3, one of the other (K−1) projectors 3 is set. In the same manner, after it is ascertained which of the images represented by the projection light, of the projection images Img_1 to Img_K, is being projected, the set projector 3 then sets one of the other (K−2) projectors 3. By repeating such an operation, it is possible to ascertain which of the images represented by the image light, of the projection images Img_1 to Img_K, is projected by which of the K projectors 3.

In the projector 3 responsible for projecting the image light representing the odd-numbered image counted from the top among the projection images Img_1 to Img_K, the vertical scanning direction setting unit 24 sets the vertical scanning direction to the forward direction in the processing circuit 22. Further, in the projector 3 responsible for projecting the image light representing the even-numbered projection image counted from the top, the vertical scanning direction setting unit 24 sets the vertical scanning direction to the reverse direction in the processing circuit 22.

Further, as a method of setting the vertical scanning directions to be opposite to each other, a configuration may be adopted in which the vertical scanning direction is set for each of the projectors 3 in the host 2 that sequentially supplies the image data of the projection images Img_1 to Img_K to the projectors 3_1 to 3_K.

Supplementary Note

For example, the following aspects of the present disclosure are understood from the embodiments illustrated above.

A projection system according to one aspect (a first aspect) includes a first projector including a first electro-optical device configured to emit first image light representing a first screen updated by vertical scanning, a first optical path shifting element configured to shift an emission optical path of the first image light, and a first projection optical member configured to project the first image light having the emission optical path shifted; a second projector including a second electro-optical device configured to emit second image light representing a second screen updated by vertical scanning, a second optical path shifting element configured to shift an emission optical path of the second image light, and a second projection optical member configured to project the second image light having the emission optical path shifted; and a vertical scanning direction setting unit. When there is a first overlapping region in which the first image light projected by the first projection optical member and the second image light projected by the second projection optical member overlap each other along a first direction parallel to a direction of the vertical scanning, the vertical scanning direction setting unit sets a direction of the vertical scanning in the first electro-optical device and a direction of the vertical scanning in the second electro-optical device to be opposite to each other. According to the first aspect, it is possible to suppress deterioration in display quality in the first overlapping region.

In a specific aspect (a second aspect) of the first aspect, the vertical scanning direction setting unit is included in the first projector. According to the second aspect, it is not necessary to change an information processing device that supplies the image data.

In a specific aspect (a third aspect) of the first aspect, the projection system further includes an information processing device configured to supply first image data to the first electro-optical device and supply second image data to the second electro-optical device. The vertical scanning direction setting unit is included in the information processing device. According to the third aspect, the number of changes made to the projector is reduced.

In a specific aspect (a fourth aspect) of the first aspect, the projection system further includes a third projector including a third electro-optical device configured to emit third image light representing a third screen updated by vertical scanning, a third optical path shifting element configured to shift an emission optical path of the third image light, and a third projection optical member configured to project the third image light having the emission optical path shifted. When there is a second overlapping region in which the second image light projected by the second projection optical member and the third image light projected by the third projection optical member overlap each other along the first direction, the vertical scanning direction setting unit sets the direction of the vertical scanning in the second electro-optical device and a direction of the vertical scanning in the third electro-optical device to be opposite to each other. According to the fourth aspect, as in the first overlapping region, it is possible to suppress deterioration in display quality in the second overlapping region.

What is claimed is:

1. A projection system comprising:

a first projector including
- a first electro-optical device configured to emit first image light representing a first screen updated by vertical scanning,
- a first optical path shifting element configured to shift an emission optical path of the first image light, and
- a first projection optical member configured to project the first image light having the emission optical path shifted;

a second projector including
- a second electro-optical device configured to emit second image light representing a second screen updated by vertical scanning,
- a second optical path shifting element configured to shift an emission optical path of the second image light, and
- a second projection optical member configured to project the second image light having the emission optical path shifted;

a camera configured to capture an image of the first image light projected by the first projection optical member and the second image light projected by the second projection optical member;

a processor that identifies, from the image captured by the camera, whether there is a region at a location between the first screen and the second screen that is brighter than other regions and, when a brighter region is identified, determines the brighter region to be a first overlapping region in which the first image light projected by the first projection optical member and the second image light projected by the second projection optical member overlap each other along a first direction parallel to a direction of the vertical scanning; and a vertical scanning direction setting unit, wherein when the processor determines that there is a first overlapping region, the vertical scanning direction setting unit sets a direction of the vertical scanning in the first electro-optical device and a direction of the vertical scanning in the second electro-optical device to be opposite to each other.

2. The projection system according to claim 1, wherein the vertical scanning direction setting unit is included in the first projector.

3. The projection system according to claim 1, further comprising an information processing device configured to supply first image data to the first electro-optical device and supply second image data to the second electro-optical device, wherein the vertical scanning direction setting unit is included in the information processing device.

4. The projection system according to claim 1, further comprising a third projector including a third electro-optical device configured to emit third image light representing a third screen updated by vertical scanning, a third optical path shifting element configured to shift an emission optical path of the third image light, and a third projection optical member configured to project the third image light having the emission optical path shifted, wherein when there is a second overlapping region in which the second image light projected by the second projection optical member and the third image light projected by the third projection optical member overlap each other along the first direction, the vertical scanning direction setting unit sets the direction of the vertical scanning in the second electro-optical device and a direction of the vertical scanning in the third electro-optical device to be opposite to each other.

* * * * *